United States Patent
Cheung et al.

(10) Patent No.: US 6,307,647 B1
(45) Date of Patent: Oct. 23, 2001

(54) DIGITAL HALFTONING WITH ERROR DIFFUSION

(75) Inventors: Allan Chiwan Cheung; Scott Michael Heydinger; Shaun Timothy Love, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 08/435,592

(22) Filed: May 5, 1995

(51) Int. Cl.[7] .................................................. H04N 1/40
(52) U.S. Cl. .................................................................. 358/456
(58) Field of Search .................................... 358/400, 429, 358/443, 445, 459, 456, 457, 458, 461, 463, 465, 466; 382/252, 251, 256

(56) References Cited

U.S. PATENT DOCUMENTS

| | | | |
|---|---|---|---|
| 4,876,610 | * 10/1989 | Ohsawa et al. | 358/443 |
| 4,890,167 | * 12/1989 | Nakazato et al. | 358/443 |
| 4,924,322 | * 5/1990 | Kurosawa et al. | 358/448 |
| 5,051,844 | 9/1991 | Sullivan | 358/456 |
| 5,077,812 | * 12/1991 | Kanno et al. | 382/50 |
| 5,287,419 | * 2/1994 | Sato et al. | 382/252 |
| 5,307,425 | * 4/1994 | Otsuka | 382/252 |
| 5,307,426 | * 4/1994 | Kanno et al. | 382/252 |
| 5,313,287 | * 5/1994 | Barton | 358/456 |
| 5,317,653 | * 5/1994 | Eschbach et al. | 382/50 |

* cited by examiner

Primary Examiner—Jerome Grant, II

(57) ABSTRACT

An error diffusion halftoning technique calculates only two error terms with one being divisible by two and the other being divisible by four. This is accomplished through using a modified Floyd and Steinberg type filter preferably having weights of 8-0-4-4 expressed in clockwise sequence from the origin. The direction of scanning is preferably reversed each scan line.

16 Claims, 1 Drawing Sheet

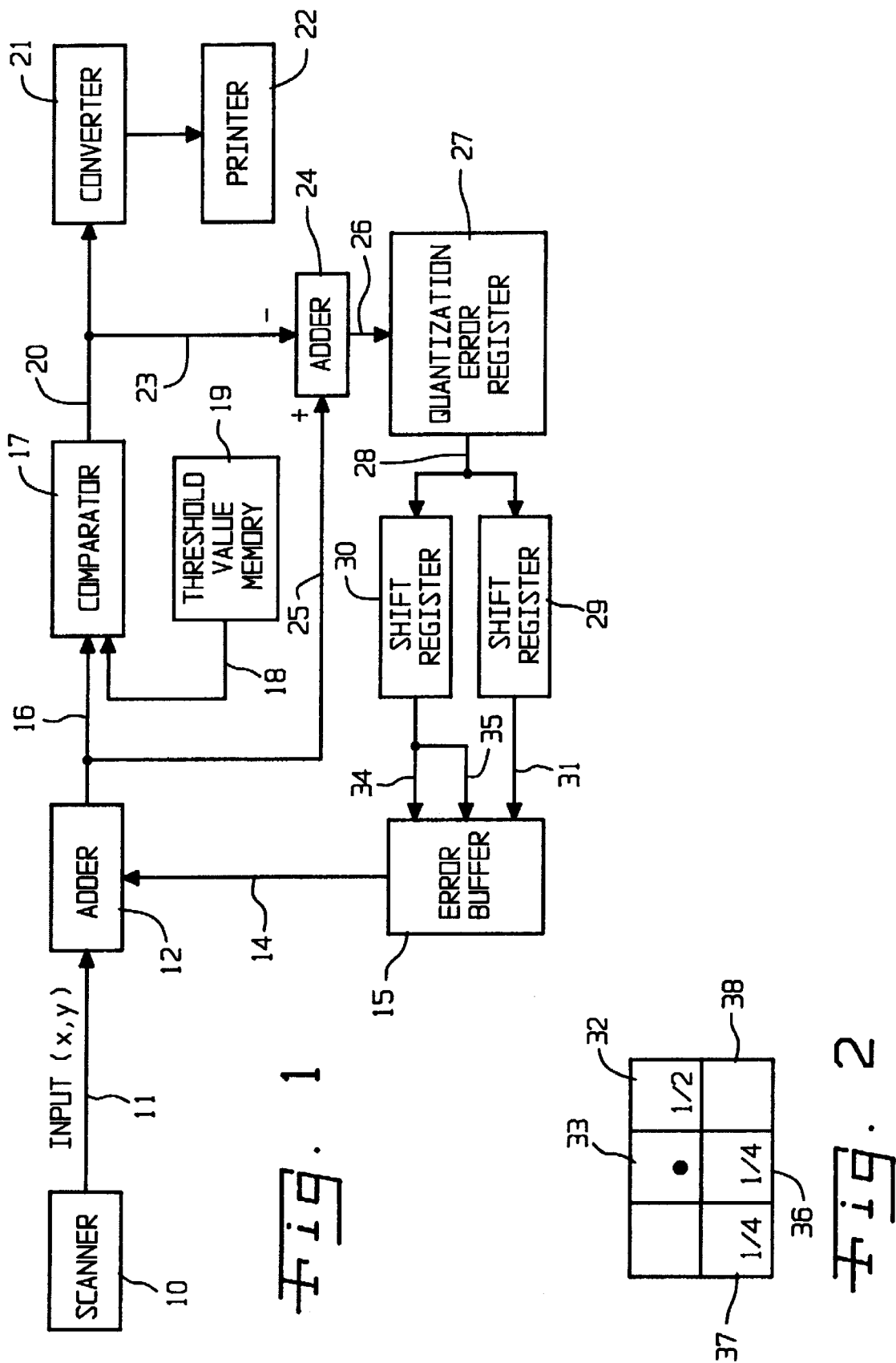

DIGITAL HALFTONING WITH ERROR DIFFUSION

FIELD OF THE INVENTION

This invention relates to digital image processing and, more particularly, to digital halftoning using error diffusion.

BACKGROUND OF THE INVENTION

Digital halftoning converts continuous tone images from gray scale pixel values to a reduced number of pixel values. These smaller number of pixel values are utilized to convert the continuous tone images into images for use in a binary output device such as a binary printer, for example, through carefully arranging the position of printed dots produced by the binary printer. Halftoning may be applied to monochrome images or to a number of color planes of a color image.

Halftoning algorithms for producing patterns that are pleasing to the human eye can be categorized as either point or neighborhood algorithms according to the number of pixels from the input gray scale image required to calculate a single binary pixel output. In point algorithms, halftoning is accomplished by a comparison of the gray scaled image for a specific pixel against a halftone mask such as a Blue Noise mask or a Void and Cluster mask, for example, that is tiled across the image being scanned. For every point in the input image, a corresponding pixel of the output image is assigned a "1" or "0" depending on whether the value of the input pixel is larger than the value of the corresponding pixel in the halftone mask.

A gray scale, binary, printing process forms a black and white image by either placing a dot or not placing a dot of black ink at each printable pixel location. An input value of I=0 at a pixel location (x, y) represents the lightest printable color, white, which is produced by printing no dot at the location (x, y). An input value of I=255 at the pixel location (x, y) represents the darkest printable color, black, which is produced by printing a dot at the location (x, y).

Shades of gray other than white or black cannot be produced at the pixel location by this printing process since a dot is either printed or not printed at each location. Therefore, the shades of gray must be simulated by printing a pattern of dots over a wider area than just one pixel.

Accordingly, an input shade of gray having a value of I is produced over a selected area by printing a dot at each location of the selected area with a probability of I/255. On average, I dots out of every 255 locations are printed. If the selected area is too small, it may be impossible to place exactly on average I dots out of 255 locations over this area. Therefore, the shade of gray is not accurately reproduced but only approximated.

Table 1 represents an 8×8 square pixel mask.

TABLE 1

| 0 | 168 | 48 | 220 | 72 | 244 | 100 | 248 |
|---|---|---|---|---|---|---|---|
| 84 | 148 | 116 | 20 | 228 | 12 | 152 | 60 |
| 196 | 32 | 184 | 128 | 68 | 188 | 124 | 224 |
| 56 | 216 | 112 | 44 | 200 | 96 | 36 | 172 |
| 164 | 8 | 136 | 212 | 28 | 232 | 204 | 104 |
| 108 | 180 | 80 | 160 | 88 | 132 | 4 | 236 |
| 144 | 24 | 240 | 52 | 192 | 64 | 156 | 76 |
| 252 | 92 | 140 | 120 | 16 | 208 | 40 | 176 |

It should be noted that the threshold values in Table 1 are uniformly distributed with the threshold values spaced every four units from 0 to 252. The threshold values of Table 1 can be used to govern the probability of a dot being printed.

For example, if a gray level value of I=33 is to be produced over an entire 8×8 square pixel area with the threshold values given by Table 1, nine dots will be printed at the positions having threshold values of 0, 4, 8, 12, 16, 20, 24, 28, and 32. Therefore, the gray level value of I=33 is approximated by 9 dots out of 64 where 9/64 locations is approximately equal to 33/255. The nine dots are placed at the locations marked by X in Table 2. It is assumed that Table 2 was constructed so that this pattern of nine dots is a desirable arrangement of nine dots for a gray level value of I=33.

TABLE 2

| X |   |   |   |   |   |   |   |
|---|---|---|---|---|---|---|---|
|   |   |   |   | X |   | X |   |
|   |   | X |   |   |   |   |   |
|   |   | X |   |   | X |   |   |
|   |   |   |   |   |   |   | X |
|   | X |   |   |   |   |   |   |
|   |   |   |   | X |   |   |   |
|   |   |   |   |   |   |   |   |

Neighborhood algorithms such as error diffusion, for example, do not need a halftone mask. The halftoning technique of error diffusion is generally attributed to Robert Floyd and Louis Steinberg as set forth in "An Adaptive Algorithm for Spatial Gray Scale," 1975 *SID International Symposium, Digest of Technical Papers*, pp. 36–37. This algorithm is unlike a halftoning mask in that the decision to place or not to place a dot at the specific location (x, y) depends on the image values at other pixel locations.

If a black-and-white image having image values of I(x, y) is to be printed on a binary printer, assume that each pixel has associated with it a threshold value T which is invariant for x and y values. If I(x, y) equals only either 0 or 255, the image can be reproduced as intended since not printing a dot corresponds to printing a value of I=0 while printing a dot corresponds to printing a value of I=255.

The problem occurs when I(x, y) is not equal to 0 or 255 for some x and y location; this is usually the situation with items such as photographs, for example. In this situation, printing or not printing a dot causes there to be an error from the actual value of the input image. If a dot is placed at the position (x, y), an error equal to the amount of 255−I(x, y) is generated at the position (x, y). If a dot is not placed, an error equal to the amount I(x, y) is generated at the position (x, y).

The error diffusion algorithm calculates the error at the specific position as the result of quantization and diffuses this error to neighboring dots. If a dot is printed at the position (x, y), some amount of the error is subtracted from neighboring dots to decrease their probability of being printed to compensate for overprinting at the position (x, y). Similarly, if a dot is not printed at the position (x, y), some amount of the error is added to neighboring dots to increase their probability of being printed to compensate for underprinting at the position (x, y). The algorithm proposed by Floyd and Steinberg spreads 7/16 of the error generated at the position or location (x, y) to a location (x+1, y), 3/16 to a location (x−1, y+1), 5/16 to a location (x, y+1), and 1/16 to a location (x+1, y+1).

When the value I(x, y) is between 0 and 255, this value can be thought of as the number of dots out of 255 to printed. If I(x, y) is constant over a wide area, on average, I(x, y) dots out of 255 will be printed in this area.

Numerous enhancements have been suggested to enhance the output quality of error diffusion. These include varying the threshold value by some amount as a function of x and y, varying the order in which pixels are quantized, and varying the amount of error spread to neighboring pixels as well as the choice of pixels to which the error is spread.

The relatively simple Floyd and Steinberg technique requires, for each pixel, calculation of four separate error terms, weighted according to an error diffusion filter, with these four error terms being added to the four corresponding neighboring pixels. Thus, known error diffusion techniques are computationally intensive and time consuming.

With the pixel located at a specific location (x, y), the first error term of the Floyd and Steinberg technique is produced by 7/16 of the quantization error being distributed to the next pixel (x+1, y) to be scanned in the same line. The pixel at a location (x+1, y+1) in the next scan line and one unit to the right (if scanning from left to right) has 1/16 of the quantization error distributed thereto. The pixel disposed at a location (x, y+1) in the next scanned line below the processing pixel has 5/16 of the quantization error distributed thereto. The pixel at a location (x−1, y+1) in the next scanned line and one pixel prior to the processing pixel has 3/16 of the quantization error distributed thereto. The weight of the quantization error for each pixel is provided by the error diffusion filter.

Thus, the Floyd and Steinberg technique is computationally intensive. As a result, the Floyd and Steinberg technique is time consuming.

Furthermore, the Floyd and Steinberg technique produces halftone images with artifacts, which are apparent patterns known to the industry as "worms."

It has previously been suggested to reduce the artifacts through distributing the errors to more of the neighbors of the pixel being scanned but this further increases the computational time. One previously suggested technique is disclosed in U.S. Pat. No. 5,313,287 to Barton. The aforesaid Barton patent uses both a matrix and error diffusion with the error diffusion having a 3-weight filter to reduce the error diffusion processing time.

Another problem with the presently available error diffusion process is directional hysteresis. This is particularly apparent in areas having very light gray levels and very dark gray levels. It has previously been suggested to utilize a serpentine or boustrophedonic raster to break up the directionality of a normal raster. The aforesaid Barton patent utilizes more than one scan in the same direction before reversing the scanning direction.

SUMMARY OF THE INVENTION

The present invention overcomes the foregoing problems by speeding up the error diffusion process to reduce the time required for computation. The present invention also improves the quality of halftone images by reducing artifacts.

This invention reduces the computational time through employing only two different weights of error terms with the smaller of the two weights being utilized twice. Thus, only two error terms have to be computed even though three neighboring pixels to the scanned pixel have errors added or subtracted therefrom. Additionally, by having one of the weighted error terms twice the magnitude of the other weighted error term, the present technique provides certain computational advantages.

Each of the two weights for the error terms is a multiple of 2 so that a shift in a binary shift register can be utilized to obtain each of the weighted error terms. For example, a 32-bit register can divide by 2 through shifting the contents of the register to the right one bit, re-moving the rightmost bit of the 32 bits, and adding a "0" as the leftmost bit. For example, if "110" are the three rightmost bits in the register to represent a decimal value of six, the removal of the rightmost bit changes these three bits to "011" which represents a decimal value of three. Since the original rightmost (least significant) bit of the number to be divided by two is discarded, the division operation is substantially "six divided by two equals three."

Similarly, multiplication can be accomplished through removing the leftmost bit, shifting the contents of the register to the left one bit, and adding a "0" to the rightmost bit location. For example, the decimal value of seven would be represented in the register by each of the three rightmost bits being a "1," and the addition of a "0" as the rightmost bit would produce "1110" which is 14.

Through scanning in the serpentine fashion, it has been determined that artifacts in halftone images produced by error diffusion are reduced. This scanning in opposite directions changes the undesirable worm-like patterns to generally horizontal from generally diagonal.

An object of this invention is to provide an improved error diffusion technique.

Another object of this invention is to provide an error diffusion technique in which the computational time is significantly reduced.

A further object of this invention is to provide an error diffusion technique which improves the output image quality.

Other objects of this invention will be readily perceived from the follow description, claims, and drawing.

BRIEF DESCRIPTION OF THE DRAWING

FIG. 1 is a schematic diagram of an apparatus of the present invention using the error diffusion technique.

FIG. 2 is a schematic diagram of a two-weight error diffusion filter of the present invention.

DETAILED DESCRIPTION OF PREFERRED EMBODIMENT

The present invention employs an error diffusion halftoning technique in which it is necessary to calculate only two error terms with one being divisible by two and the other being divisible by four. This technique eliminates the relatively large amount of time required for computation with present error diffusion halftoning techniques.

To carry out the present invention, an error diffusion like algorithm is employed with the input signals of the image being processed as follows:

```
for (y = first line; y <= last line; y++) { /*for all scanlines */
    for (x = leftmost pixel; x <= rightmost pixel; x++) {
        /*for all pixels on the scanline*/
        input_buffer (x,y) = input(x,y) + error_buffer(x,y);
        if ( input_buffer(x,y) <= THRESHOLD ) {
            output_image(x,y) = 0;
            quantization_error = input_buffer(x,y);
            error_buffer(x+1, y) += quantization_error >> 1;
                /*divide by 2, utilizing the shift
    operation */
            error_buffer(x,y+1) += quantization_error >> 2;
            error_buffer(x−1,y+1) += quantization_error >> 2;
```

```
                        /*divide by 4, utilizing the shift
        operation*/
            }
            else {
                    output_image(x,y) = 255;
                    quantization_error = input_buffer(x,y) - 255;
                    error_buffer(x+1, y) += quantization_error >> 1;
                        /*divide by 2, utilizing the shift
        operation*/
                    error_buffer(x,y+1) += quantization_error >> 2;
                    error_buffer(x-1,y+1) += quantization_error >> 2;
                        /*divide by 4, utilizing the shift
        operation*/
                }
        }
        y++;
        for (x = rightmost pixel; x >= leftmost pixel; x- -) {
                /*processing the scanline in the opposite
        direction*/
                input_buffer (x,y) = input(x,y) + error_buffer(x,y);
                if ( input_buffer(x,y) <= THRESHOLD ) {
                    output_image(x,y) = 0;
                    quantization_error = input_buffer(x,y);
                    error_buffer(x-1, y) += quantization_error >> 1;
                        /*divide by 2, utilizing the shift
        operation*/
                    error_buffer(x,y+1) += quantization_error >> 2;
                    error_buffer(x+1,y+1) += quantization_error >> 2;
                        /*divide by 4, utilizing the shift
        operation*/
                }
                else {
                    output_image(x,y) = 255;
                    quantization_error = input_buffer(x,y) - 255;
                    error_buffer(x-1, y) += quantization_error >> 1;
                        /*divide by 2, utilizing the shift
        operation*/
                    error_buffer(x,y+1) += quantization_error >> 2;
                    error_buffer(x+1,y+1) += quantization_error >> 2;
                        /*divide by 4, utilizing the shift
        operation*/
                }
        }
}
```

An apparatus for carrying out the method of the present invention is shown in FIG. 1. The apparatus includes a scanner 10, which supplies a digitized input signal over its output line 11 to an adder 12. The input signal to the adder 12 typically has an intensity or density value of I (x, y) for each specific location (x, y) of a pixel in a rectangular array of scan lines of pixels.

In addition to the adder 12 receiving the initial intensity or density value of the pixel at a specific location (x, y) from the scanner 10, the adder 12 also receives an error signal from an output line 14 of an error buffer 15. Thus, the adder 12 adds the initial intensity or density value from the scanner 10 and the error correction value from the error buffer 15 for the specific pixel. The adder 12 supplies the modified value of the specific pixel on its output line 16 to a comparator 17. The value of the signal on the line 16 is thus made up of the initial density value, which can vary from 0 to 255 depending on the intensity or density of the pixel being scanned, modified by the error correction value from the error buffer 15.

The comparator 17 compares the value on the output line 16 of the adder 12 with a threshold value T supplied to the comparator 17 from an output line 18 of a threshold value memory 19. The threshold value memory 19 may have the threshold value T changed as desired.

When the value of the signal on the output line 16 of the adder 12 exceeds the threshold value T on the output line 18 of the threshold value memory 19, the comparator 17 provides a signal having a value of 255 on its output line 20. When the value of the signal on the output line 16 of the adder 12 does not exceed the threshold value T on the output line 18 of the threshold value memory 19, the comparator 17 provides a signal having a value of 0 on its output line 20.

This signal on the output line 20 of the comparator 17 is supplied through a converter 21 in which the value of the signal on the output line 20 of the comparator 17 is converted to a binary "0" if the value of the signal on the output line 20 of the comparator 17 is 0. If the value of the signal on the output line 20 of the comparator 17 is 255, the converter 21 converts the value of this signal to a binary "1."

The converter 21 is connected to a binary printer 22. The binary printer 22 will print a dot for the specific pixel location if the output from the converter 21 is a binary "1" and will not print a dot for the specific pixel location if the output of the converter 21 is a binary "0."

The output line 20 of the comparator 17 also is connected through a line 23 to an adder 24. The adder 24 also is connected to the output line 16 of the adder 12 through a line 25.

The adder 24 adds the value on the line 25 from the adder 12 while it subtracts the value of the signal on the line 23, which has the value of the signal on the output line 20 of the comparator 17 thereon. The adder 24 supplies the difference of these two values over its output line 26 to a quantization error register 27.

When the signal on the line 23 is 255, the printer 22 prints a dot at the specific pixel location, and there is compensation at adjacent pixel locations. Thus, the difference between 255 and the modified value of the printed pixel on the line 25 is supplied as a number on the output line 26 of the adder 24 to the quantization error register 27.

When the signal on the line 23 is 0, the printer 22 does not print a dot at the specific pixel location, and there is compensation at adjacent pixel locations. Therefore, the difference between 0 and the modified value of the non-printed pixel is supplied as a number on the output line 26 of the adder 24 to the quantization error register 27.

The value of the signal in the quantization error register 27 is transferred over its output line 28 to two shift registers 29 and 30. The two shift registers 29 and 30 constitute an error diffusion filter.

The value of the signal on the output line 28 of the quantization error register 27 is supplied to the shift registers 29 and 30 by triggering the shift registers 29 and 30. The value of the signal is divided by two in the shift register 29 and by four in the shift register 30.

The signal from the shift register 29 is supplied over its output line 31 to an address in the error buffer 15 that represents a pixel location 32 (x+1, y) in FIG. 2. The pixel being scanned or processed is at a pixel location 33 (x, y) so that the pixel location 32 is the next pixel location (x+1, y) to be scanned or processed. This shows that one-half of the total error signal is supplied to the address in the error buffer 15 (see FIG. 1) representing the pixel location 32 (see FIG. 2).

The shift register 30 (see FIG. 1) supplies its output signal over two output lines 34 and 35 to two addresses in the error buffer memory 15 representing pixel locations 36 (see FIG. 2) and 37. The pixel location 36 is (x, y+1) so that it is on the next line and aligned with the pixel being scanned or processed. The pixel location 37 is (x−1, y+1) so that it is on the next line and aligned with the pixel prior to the pixel being scanned or processed.

Since the shift register 30 (see FIG. 1) divided the output signal from the quantization error register 27 by four whereas the shift register 29 divided the output signal from the quantization error register 27 by two, the magnitude or weight of the diffused error at the pixel location 32 (x+1, y) (see FIG. 2) is one-half of the total error term created by the pixel at the pixel location 33 while one-fourth of the error term is at each of the pixel locations 36 (x, y+1) and 37 (x−1, y+1). Therefore, the weight of the error term at the pixel location 32 is twice the weight of the error term at each of the pixel locations 36 and 37.

It should be understood that the preferred distribution of each portion of each of the error terms by the error diffusion filter, (weights of 8-0-4-4, in 16th's, expressed in clockwise sequecnce from the origin, pixel location 33) is shown in FIG. 2. However, the values of the error terms can be shifted between the pixel locations 32, 36, and 37 and a pixel location 38 (x+1, y+1), which has no portion of the error term applied to it in the preferred distribution. In shifting the values of the error terms, it is necessary that one of the four pixel locations 32, 36, 37, and 38 not have any portion of the error term for the pixel at the pixel location 32 in it, one of the other three of the four pixel locations 32, 36, 37, and 38 has one-half of the error term for the pixel at the pixel location 32, and each of the two remaining of the four pixel locations has one-fourth of the error term for the pixel at the pixel location 32. Each of these arrangements of the error term will produce an improved output image quality.

While the preferred embodiment of the present invention reverses the scanning direction at the end of each line of scan, it should be understood that scanning could occur in the same direction for two lines. While this does not produce as good an output image quality as changing scan direction at the end of each scan line, it does produce a satisfactory output image quality.

An advantage of this invention is that it reduces the processing time in a digital halftone system. Another advantage of this invention is that it improves the output image quality of a binary printer by reducing the artifacts in the output images. A further advantage of this invention is that it decreases the number of error components needed in the error diffusion technique to only two. Still another advantage of this invention is that it simplifies computing the error terms obtained through an error diffusion filter.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An error diffusion method for halftoning a digital image formed of an array of scan lines of pixels, each pixel having a gray value, for forming an output image including:
   scanning each line of image pixels in a processing direction from one end of the scan line to the other;
   determining the gray value of each image pixel;
   and error diffusing each of the image pixels by using an error diffusion filter having weights of 8-0-4-4 expressed in clockwise sequence from the origin.

2. The method according to claim 1 including changing the processing direction for each scan line of pixels so that the processing direction changes from each scan line to the next.

3. An error diffusion method for halftoning, a digital image formed of an array of scan lines of pixels, each pixel having a gray value, for forming an output image including:
   scanning each line of image pixels in a processing direction from one end of the scan line to the other;
   determining the gray value of each image pixel;
   and error diffusing each of the image pixels through using a three term, two-weight error diffusion filter having weights of 8-0-4-4.

4. The method according to claim 3 in which the three term, two-weight error diffusion filter is an error diffusion filter having weights of 8-0-4-4 expressed in clockwise sequence from the origin.

5. The method according to claim 4 including changing the processing direction for each scan line of pixels so that the processing direction changes from each scan line to the next.

6. The method according to claim 3 including:
   applying the magnitude of the one term to one of
      (a) the next scanned image pixel and
      (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned;
   and applying the magnitude of the other two terms to two of the remaining three of
      (a) the next scanned image pixel and
      (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned.

7. The method according to claim 6 including changing the processing direction for each scan line of pixels so that the processing direction changes from each scan line to the next.

8. The method according to claim 3 including;
   applying the magnitude of the one error term to the next scanned image pixel;
   and applying the magnitude of the other two error terms to each of two of three consecutive image pixels in the next scan line with the three consecutive image pixels beginning with the image pixel vertically aligned with the image pixel in the scan line being scanned that precedes the image pixel being error diffused and ending with the image pixel vertically aligned with the next image pixel to be scanned.

9. The method according to claim 8 including changing the processing direction for each scan line of pixels so that the processing direction changes from each scan line to the next.

10. The method according to claim 3 including:
   applying the one error term to one of
      (a) the next scanned image pixel and
      (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned;
   and applying the other two error terms to each of two of the remainder of
      (a) the next scanned image pixel and
      (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned.

11. The method according to claim 10 including changing the processing direction for each scan line of pixels so that the processing direction changes from each scan line to the next.

12. The method according to claim 3 including changing the processing direction for each scan line of pixels so that the processing direction changes from each scan line to the next.

13. An apparatus for halftoning a digital image formed of an array of scan lines of pixels in which each pixel has a gray value to form an output image through error diffusion including:

scanning means for scanning each line of image pixels in a processing direction from one end of the scan line to the other;

determining means for determining the initial gray value of each input pixel;

correction means for changing the initial gray value for each of the input pixels in accordance with the error corrections at other pixels having predetermined locations relative to the input pixel so that a modified value is produced for the input pixel;

said correction means including error diffusion means for applying one half of the magnitude of the error produced by the input pixel being scanned to one of
  (a) the next scanned image pixel and
  (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned and applying one fourth of the magnitude of the error produced by the image pixel being error diffused to each of two of
  (a) the next scanned image pixel and
  (b) the three consecutive image pixels in the next scan line beginning with the image pixel vertically aligned with the image pixel in the scan line being scanned that precedes the image pixel being error diffused and ending with the image pixel vertically aligned with the next image pixel to be scanned;

and ascertaining means for ascertaining if the modified value of the input pixel exceeds a threshold value.

14. The apparatus according to claim 13 in which said error diffusion means applies one half of the magnitude of the error produced by the image pixel being error diffused to the next scanned image pixel and one fourth of the magnitude of the error produced by the image pixel being error diffused to each of two of three consecutive image pixels in the next scan line with the three consecutive image pixels beginning with the image pixel vertically aligned with the image pixel in the scan line being scanned that precedes the image pixel being error diffused and ending with the image pixel vertically aligned with the next image pixel to be scanned.

15. The apparatus according to claim 13 in which said error diffusion means includes a three term, two-weight error diffusion filter in which the magnitude of one of the three error terms is twice the magnitude of the other two of the three error terms.

16. The apparatus according to claim 13 in which said error diffusion means is a three term, two-weight error diffusion filter having weights of 8-0-4-4 expressed in clockwise sequence from the origin.

* * * * *